(12) United States Patent
Parhi et al.

(10) Patent No.: US 7,080,115 B2
(45) Date of Patent: Jul. 18, 2006

(54) LOW-ERROR CANONIC-SIGNED-DIGIT FIXED-WIDTH MULTIPLIER, AND METHOD FOR DESIGNING SAME

(75) Inventors: Keshab K Parhi, Mission Viejo, CA (US); Jin-Gyun Chung, Jeonbuk (KR); Sang-Min Kim, Minneapolis, MN (US)

(73) Assignee: Broadcom Corporation, Irvine, CA (US)

( * ) Notice: Subject to any disclaimer, the term of this patent is extended or adjusted under 35 U.S.C. 154(b) by 652 days.

(21) Appl. No.: 10/420,889

(22) Filed: Apr. 23, 2003

(65) Prior Publication Data

US 2003/0220956 A1 Nov. 27, 2003

Related U.S. Application Data

(60) Provisional application No. 60/382,064, filed on May 22, 2002.

(51) Int. Cl.
*G06F 7/52* (2006.01)
*G06F 7/38* (2006.01)

(52) U.S. Cl. ..................... 708/625; 708/550

(58) Field of Classification Search ............. 708/503, 708/620, 625, 626, 628, 630, 550, 551
See application file for complete search history.

(56) References Cited

U.S. PATENT DOCUMENTS

| | | | | |
|---|---|---|---|---|
| 6,148,319 A | * | 11/2000 | Ozaki | 708/625 |
| 6,957,244 B1 | * | 10/2005 | Jou et al. | 708/628 |
| 2002/0032713 A1 | * | 3/2002 | Jou et al. | 708/625 |

OTHER PUBLICATIONS

Jou, J.M. and Kuang, S.R., "Design of Low-Error Fixed-Width Multiplier For DSP Applications," *Electronics Letters* 33(19):1597-1598, IEE (Sep. 1997).

Van, L. et al., "Design of the Lower Error Fixed-Width Multiplier And Its Applications," *IEEE Transactions On Circuits And Systems—II: Analog And Digital Signal Processing* 47(10):1112-1118, IEEE (Oct. 2000).

(Continued)

*Primary Examiner*—Chuong D. Ngo
(74) *Attorney, Agent, or Firm*—Sterne, Kessler, Goldstein & Fox P.L.L.C.

(57) ABSTRACT

An error compensation bias circuit and method for a canonic signed digit (CSD) fixed-width multiplier that receives a W-bit input and produces a W-bit product. Truncated bits of the multiplier are divided into two groups (a major group and a minor group) depending upon their effects on quantization error. An error compensation bias is expressed in terms of the truncated bits in the major group. The effects of the remaining truncated bits in the minor group are taken into account by a probabilistic estimation. The error compensation bias circuit typically requires only a few logic gates to implement.

22 Claims, 12 Drawing Sheets

OTHER PUBLICATIONS

Kidambi, S.S. et al., "Area-Efficient Multipliers For Digital Signal Processing Applications," *IEEE Transactions On Circuits And Systems—II: Analog And Digital Signal Processing* 43(2):90-94, IEEE (Feb. 1996).

Jou, S. and Wang, H., "Fixed-Width Multiplier For DSP Application," *Proceedings of the 2000 International Conference On Computer Design*:318-322, IEEE (Sep. 2000).

Coleman, J. and Yurdakul, A., "Fractions In The Canonical-Signed-Digit Number System," *2001 Conference On Information Sciences And Systems:1-2*, The Johns Hopkins University, Baltimore, Maryland (Mar. 2001).

Kim S. et al., "Sign Extension Reduction By Propagated-Carry Selection," *Conference Record of the Thirty-Fifth Asilomar Conference On Signals, Systems & Computers*—vol. 1:134-138, IEEE (Nov. 2001).

Koren, I., *Computer Arithmetic Algorithms*, Prentice-Hall International, Inc. (1993).

\* cited by examiner

| $x_2 \overline{x_4} \overline{x_6} x_8$ | $\dfrac{LP'_{MAJOR}}{2} + E\left(\dfrac{LP'_{MINOR}}{2}\right)$ | $\sigma_{INV}$ |
|---|---|---|
| 0000 | 1.0459 | 1 |
| 0001 | 1.5459 | 2 |
| 0010 | 1.4209 | 1 |
| 0011 | 1.9209 | 2 |
| 0100 | 1.6396 | 2 |
| 0101 | 2.1396 | 2 |
| 0110 | 2.0146 | 2 |
| 0111 | 2.5146 | 3 |
| 1000 | 1.3975 | 1 |
| 1001 | 1.8975 | 2 |
| 1010 | 1.7725 | 2 |
| 1011 | 2.2725 | 2 |
| 1100 | 1.9912 | 2 |
| 1101 | 2.4912 | 2 |
| 1110 | 2.3662 | 2 |
| 1111 | 2.8662 | 3 |

FIG.5

| $x_2 \overline{x_4} \overline{x_6} x_8$ | $\sigma_{INV}$ | $c_2$ | $c_3$ |
|---|---|---|---|
| 0000 | 1 | 0 | 0 |
| 0001 | 2 | 1 | 0 |
| 0010 | 1 | 0 | 0 |
| 0011 | 2 | 1 | 0 |
| 0100 | 2 | 1 | 0 |
| 0101 | 2 | 1 | 0 |
| 0110 | 2 | 1 | 0 |
| 0111 | 3 | 1 | 1 |
| 1000 | 1 | 0 | 0 |
| 1001 | 2 | 1 | 0 |
| 1010 | 2 | 1 | 0 |
| 1011 | 2 | 1 | 0 |
| 1100 | 2 | 1 | 0 |
| 1101 | 2 | 1 | 0 |
| 1110 | 2 | 1 | 0 |
| 1111 | 3 | 1 | 1 |

|  | AVERAGE | VARIANCE |
|---|---|---|
| ROUNDED TO 10 BIT FROM IDEAL PRODUCT | $4.883 \times 10^{-4}$ | $7.948 \times 10^{-8}$ |
| TRUNCATED TO 10 BIT FROM IDEAL PRODUCT | $9.7328 \times 10^{-4}$ | $3.1789 \times 10^{-7}$ |
| $\sigma_{van}$ | $8.952 \times 10^{-4}$ | $4.1901 \times 10^{-7}$ |
| $\sigma_{INV}$ | $5.8647 \times 10^{-4}$ | $1.6505 \times 10^{-7}$ |

FIG.10

|  | AVERAGE | VARIANCE |
|---|---|---|
| ROUNDED TO 10 BIT FROM IDEAL PRODUCT | 1 | 1 |
| TRUNCATED TO 10 BIT FROM IDEAL PRODUCT | 1.9932 | 4 |
| $\sigma_{van}$ | 1.8333 | 5.272 |
| $\sigma_{INV}$ | 1.201 | 2.077 |

FIG.11

LOW-ERROR CANONIC-SIGNED-DIGIT FIXED-WIDTH MULTIPLIER, AND METHOD FOR DESIGNING SAME

CROSS-REFERENCE TO RELATED APPLICATIONS

This application claims the benefit of U.S. Provisional Application No. 60/382,064, filed May 22, 2002, which is incorporated herein by reference in its entirety.

STATEMENT REGARDING FEDERALLY-SPONSORED RESEARCH AND DEVELOPMENT

This invention was made with Government support under Grant No. 02-456, Disclosure No. CCR-9988262, awarded by the National Science Foundation. The Government has certain rights in this invention.

FIELD OF THE INVENTION

The present invention relate to data processing. More particularly, it relates to fixed-width multiplication of data.

BACKGROUND OF THE INVENTION

In many multimedia and digital signal processing (DSP) applications, for example, multiplication operations have a fixed-width property. This property means that input data and output results for multiplication operations have the same bit width. In these applications, multiplication by a W-bit constant multiplier is typically carried out using fixed-width constant multiplier systems and methods. In fixed-width constant multiplier systems and methods, the partial product terms corresponding to the nonzero bit positions in the constant multiplier are added to form the desired product.

In many fixed-width constant multiplier systems and methods, in order to implement the fixed-width property the "2W−1" bit product obtained from a W-bit multiplicand and a W-bit multiplier is quantized to W-bits by eliminating the "W−1" least-significant bits. This quantization, however, results in truncation errors that make these systems and methods unsuitable for many applications. Improved fixed-width multiplier schemes and/or designs such as, for example, Baugh-Wooley multipliers or parallel array multipliers exist. (See, e.g., S. S. Kidambi et al., "Area-efficient multipliers for digital signal processing applications," *IEEE Trans. Circuits Syst. II*, vol. 43, pp. 90–94 (February 1996); J. M. Jou and S. R. Kuang, "Design of a low-error fixed-width multiplier for DSP applications," *Electron. Lett.*, vol. 33, no. 19, pp. 1597–1598 (1997); L. D. Van et al., "Design of the lower error fixed-width multiplier and its applications," *IEEE Trans. Circuits Syst. II*, vol. 47, pp. 1112–1118 (October 2000); and S. J. Jou and H. H. Wang, "Fixed-width multiplier for DSP application," in *Proceedings of 2000 ICCD* (Austin, Tex.), pp. 318–322 (September 2000); each of which is incorporated herein in its entirety.) These improved fixed-width multipliers, which implement the fixed-width property, operate by introducing biases into retained adder cells in order to compensate for the omitted "W−1" least-significant bits. Each of these improved fixed-width multiplier schemes and/or designs, however, still introduces errors into the multiplication output results, which for certain applications are significant.

Consider, for example, Kidambi et al. Kidambi et al. relates to a constant bias scheme wherein a constant bias is added to the retained cells. This constant bias scheme cannot be adjusted adaptively by the input signals, however, and the resulting truncation error is typically large. In Jou and Kuang and in Van et al., error compensation biases are generated using an indexing scheme. The indices used in these schemes attempt to incorporate the effects of the input signals and thus are an improvement over Kidambi et al. However, although quantization errors may be reduced by using indices, these schemes still have limitations that introduce errors into the multiplication output results, which for certain applications are significant. In Jou and Wang, statistical analysis and linear regression analysis are used to generate a bias that is added to retained adder cells. This scheme, however, also introduces errors into the multiplication output results, which for certain applications are significant. Thus, there is a need for new schemes and/or designs that do not have the limitations of the conventional schemes and/or designs.

What is needed is a new lower-error fixed-width multiplier, and a method for designing the same, that overcomes the limitations of the conventional fixed-width multiplier schemes and/or designs.

BRIEF SUMMARY OF THE INVENTION

The present invention provides a low-error canonic signed digit (CSD) fixed-width multiplier and a method for designing the CSD fixed-width multiplier. In an embodiment, the CSD fixed-width multiplier of the present invention includes a plurality of adder cells and an error compensation bias circuit. The CSD fixed-width multiplier is useful, for example, for implementing multimedia applications and digital signal processing applications.

In accordance with the present invention, truncated bits of the CSD fixed-width multiplier are divided into two groups (a major group and a minor group) depending upon their effects on quantization error. The desired error compensation bias is expressed in terms of the truncated bits in the major group. This error compensation bias expression is used to form the error compensation bias circuit. The effects of bits in the minor group are taken into consideration using a probabilistic estimation. In an embodiment, the error compensation bias circuit is formed by selecting a CSD multiplier/value (Y), multiplying a W-bit variable (X) by the canonic signed digit multiplier/value (Y) to produce sign-extended partial products each having an associated weight ($2^n$), associating each partial product with a most significant bit group (MP) or a least significant bit group (LP), associating the partial products of the least significant bit group (LP) with a major least significant bit group ($LP_{major}$) or a minor least significant bit group ($LP_{minor}$), computing an error compensation bias for each possible input bit combination of the partial products having the greatest weight of the least significant bit group (LP), and forming a circuit to generate the error compensation biases computed in the computing step from the partial products having the greatest weight of the least significant bit group (LP).

The CSD fixed-width multiplier of the present invention can be used to form a wide variety of electrical products. For example, in one embodiment, the CSD fixed-width multiplier forms part of a digital filter. In another embodiment, the CSD fixed-width multiplier forms part of an equalizer. In still other embodiments, the CSD fixed-width multiplier forms, for example, part of a receiver, a transceiver, a decoder, or a mixer.

It is an advantage of the CSD fixed-width multiplier of the present invention that it has improved accuracy. It is also an advantage that the CSD fixed-width multiplier of the present invention requires less integrated circuit area and power to operate than conventional fixed-width multipliers.

Further embodiments, features, and advantages of the present invention, as well as the structure and operation of the various embodiments of the present invention are described in detail below with reference to accompanying drawings.

BRIEF DESCRIPTION OF THE DRAWINGS/FIGURES

The present invention is described with reference to the accompanying figures. In the figures, like reference numbers indicate identical or functionally similar elements. Additionally, the left-most digit or digits of a reference number identify the figure in which the reference number first appears. The accompanying figures, which are incorporated herein and form part of the specification, illustrate the present invention and, together with the description, further serve to explain the principles of the invention and to enable a person skilled in the relevant art to make and use the invention.

DETAILED DESCRIPTION OF THE INVENTION

Canonic Signed Digit (CSD) Fixed-Width Multiplier

Figure 1:
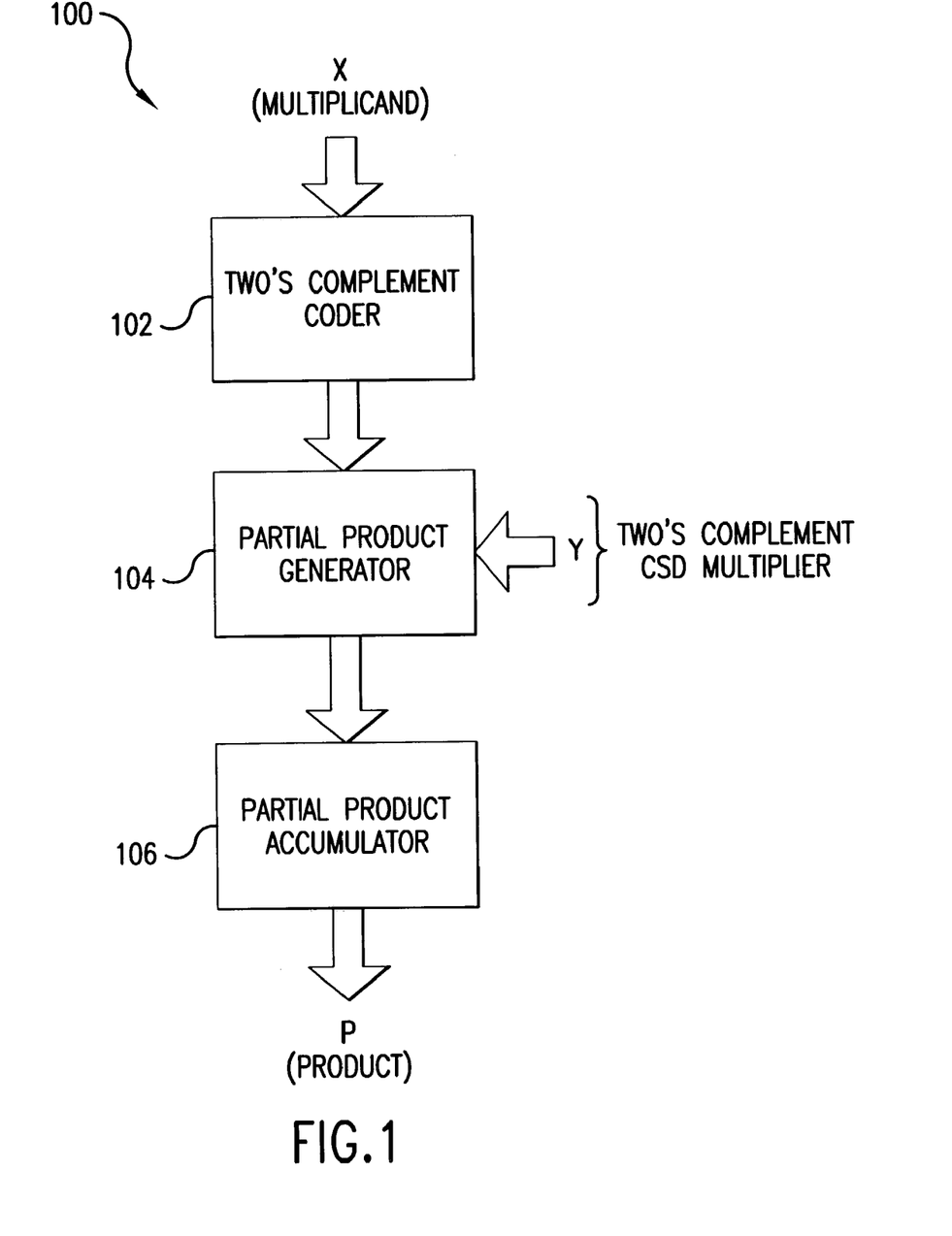
FIG. 1 illustrates a block diagram of a CSD multiplier for performing fixed-width multiplication according to the invention.

FIG. 1 illustrates a block diagram of an efficient, low-error, CSD fixed-width multiplier 100 according to the present invention. CSD fixed-width multiplier 100 includes a two's complement coder 102, a partial product generator 104, and a partial product accumulator 106. In embodiments, CSD fixed-width multiplier 100 operates as follows.

Two's complement coder 102 receives a multiplicand X and produces a two's complement of X. Partial product generator 104 operates on the two's complement of X and a two's complement CSD multiplier Y to generate partial products. Partial product accumulator 106 accumulates the partial products generated by partial product generator 104 and produces a product P.

To better understand the operation of a fixed-width multiplier, consider the multiplication of two 2's complement W-bit numbers X and Y, wherein X and Y are given by EQ. (1).

$$X = -x_{W-1} + \sum_{i=1}^{W-1} x_{W-1-i} 2^{-i}, \qquad \text{EQ. (1)}$$

$$Y = -y_{W-1} + \sum_{i=1}^{W-1} y_{W-1-i} 2^{-i}.$$

Their (2W–1)-bit ideal product $P_I$ can be expressed as:

$$P_I = MP + LP, \qquad \text{EQ. (2)}$$

where $$MP = -p_{2W-2} + \sum_{i=1}^{W-1} p_{2W-2-i} 2^{-i}, \qquad \text{EQ. (3)}$$

$$LP = \sum_{i=W}^{2W-2} p_{2W-2-i} 2^{-i}.$$

In typical fixed-width multipliers, the adder cells required for LP are omitted and appropriate biases are introduced to the retained adder cells based on a probabilistic estimation. Thus, the W-bit quantized product $P_Q$ can be expressed as:

$$P_Q = MP_Q + \sigma \times 2^{-(W-1)}, \qquad \text{EQ. (4)}$$

where $MP_Q$ is the sum of the partial products obtained without LP and $\sigma$ represents the error-compensation bias.

An efficient fixed-width multiplier design scheme for a Baugh-Wooley multiplier was proposed in Van, L. D., et al., "Design of the lower error fixed-width multiplier and its applications," IEEE Trans. Circuits Syst. II, Vol. 47, pp. 1112–1118 (October 2000).

In CSD numbers, consecutive nonzero digits are not allowed. In the Van et al. approach, the following error-compensation bias for CSD multiplications can be derived:

$$\sigma_{Van} = \sum_{i=0}^{W-2} \hat{x}_i | y_{W-2-i}, \qquad \text{EQ. (5)}$$

where, $$\hat{x}_i | y_{W-2-i} = \begin{cases} x_i, & \text{if } y_{W-2-i} = 1, \\ \bar{x}_i, & \text{if } y_{W-2-i} = -1, \\ 0, & \text{otherwise.} \end{cases} \qquad \text{EQ. (6)}$$

Figure 2:
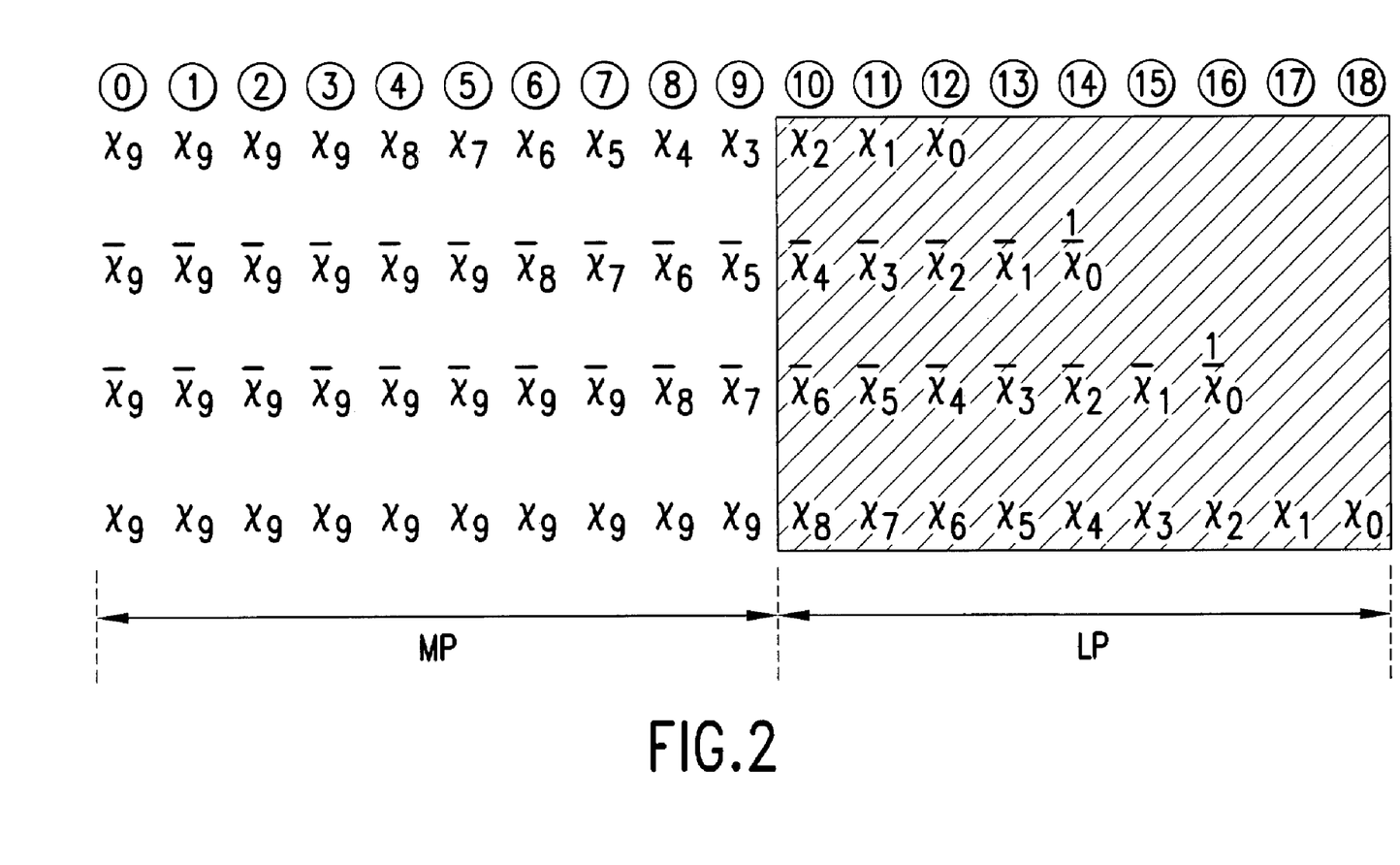
FIG. 2 illustrates partial products resulting from 10-bit canonical-signed-digit (CSD) multiplication.

Now consider the following CSD fixed-width multiplication example with W=10:

$$P_I = X \times Y \quad \text{EQ. (7)}$$

$$= x_9 x_8 x_7 x_6 x_5 x_4 x_3 x_2 x_1 x_0 \times 0.0010\overline{1}0\overline{1}01,$$

where the overbar denotes a bit complement. The sign extended partial products corresponding to the above multiplication are shown in FIG. 2. FIG. 2 illustrates the partial products resulting from 10-bit canonical-signed-digit (CSD) multiplication. From EQ. (5) and EQ. (6), the error compensation bias can be computed as:

$$\sigma_{Van} = x_2 + \overline{x_4} + \overline{x_6} + x_8. \quad \text{EQ. (8)}$$

Notice that $\sigma_{Van}$ is obtained by just adding the elements on column 10 in FIG. 2.

As can be seen from FIG. 2, sign-extension significantly increases the hardware complexity and the loading on the sign bit of the data bus. To reduce the overhead due to the sign-extension, a compensation vector approach has been widely used. (See Koren, I., "*Computer Arithmetic Algorithms*," Englewood Cliffs, N.J., Prentice-Hall International, Inc., (1993).) Another sign-extension reduction method based on propagated-carry selection has been proposed by Kim et al., by which further hardware reduction can be achieved. (See S. M. Kim et al., "*Sign extension reduction by propagated-carry selection*," in Proceedings of the 35$^{th}$ Asilomar conference on Signals, Systems, and Computers, IEEE (November 2001), which is incorporated herein by reference in its entirety.)

Bias Generation Circuit for CSD Fixed-Width Multiplier

From FIG. 2, the 10-bit quantized product $P_Q$ can be expressed as:

$$P_Q = MP_Q + \sigma \times 2^{-9}. \quad \text{EQ. (9)}$$

Since σ can be interpreted as the carry propagated from the LP part to column 9 in FIG. 2, σ can be expressed as:

$$\sigma = [LP'/2]_r, \quad \text{EQ. (10)}$$

where $$LP' = LP \times 2^w, \quad \text{EQ. (11)}$$

and $[t]_r$ is a rounding operation for t.

LP'/2 can be expressed as:

$$LP'/2 = 2^{-1}(x_2 + \overline{x_4} + \overline{x_6} + x_8) + 2^{-2}(x_1 + \overline{x_3} + \overline{x_5} + x_7) + \quad \text{EQ. (12)}$$

$$2^{-3}(x_0 + \overline{x_2} + \overline{x_4} + x_6) + 2^{-4}(\overline{x_1} + \overline{x_3} + x_5) +$$

$$2^{-5}(1 + \overline{x_0} + \overline{x_2} + x_4) + 2^{-6}(\overline{x_1} + x_3) +$$

$$2^{-7}(1 + \overline{x_0} + x_2) + 2^{-8}(x_1) + 2^{-9}(x_0).$$

Figure 3:
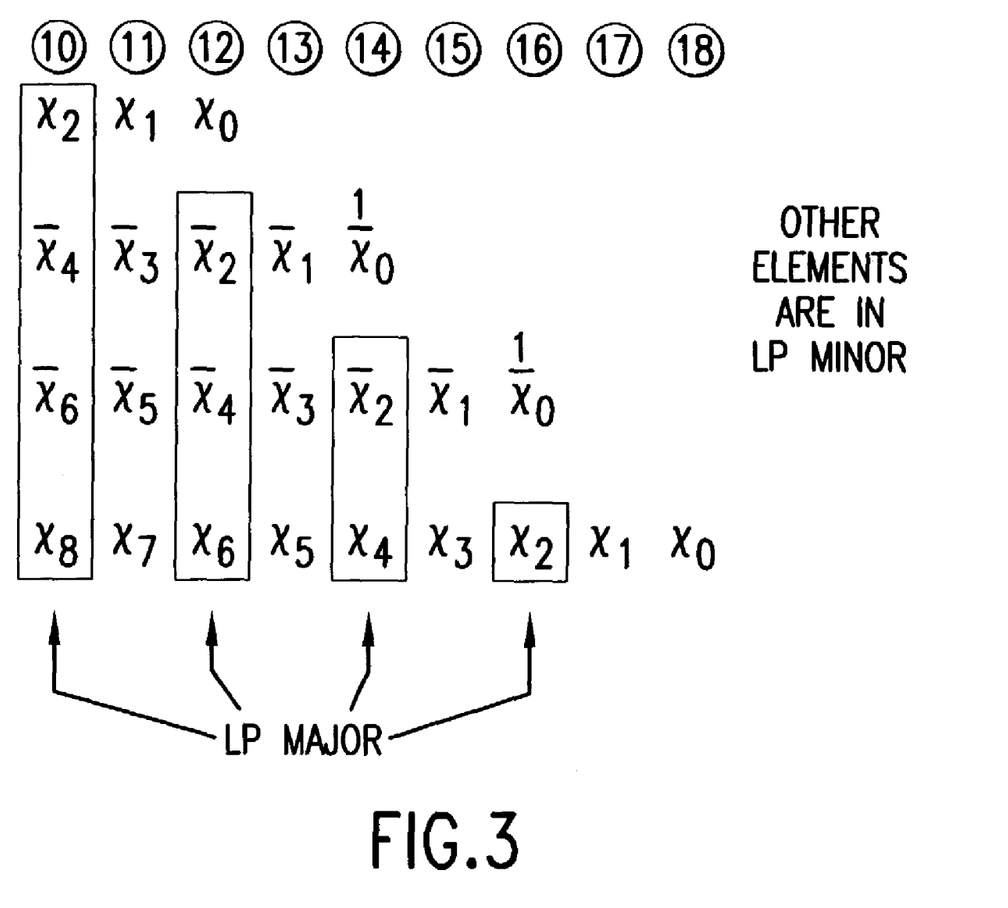
FIG. 3 illustrates how to associate partial products with a major least significant bit ($LP_{MAJOR}$) or a minor least significant bit group ($LP_{MINOR}$) according to the invention.

Notice that the elements on column 10 in FIG. 2 have a dominant effect on the carry signal generated from the LP part since these elements have the largest weight in the LP part. Thus, to generate an error compensation bias more efficiently, the LP part can be divided into $LP_{major}$ and $LP_{minor}$ parts. The elements on column 10 ($x_2$, $x_4$, $x_6$, and $x_8$) in FIG. 2 belong to $LP_{major}$ and the other elements belong to $LP_{minor}$. This is shown more clearly in FIG. 3. FIG. 3 illustrates how to associate partial products with a major least significant bit ($LP_{MAJOR}$) or a minor least significant bit group ($LP_{MINOR}$) according to the present invention.

Using $LP_{major}$ and $LP_{minor}$, EQ. (12) can be rewritten as:

$$LP'/2 = LP'_{major}/2 + LP'_{minor}/2, \quad \text{EQ. (13)}$$

where $$LP'_{major}/2 = 2^{-1}(x_2 + \overline{x_4} + \overline{x_6} + x_8) + \quad \text{EQ. (14)}$$

$$2^{-3}(\overline{x_2} + \overline{x_4} + x6) + 2^{-5}(\overline{x_2} + x_4) +$$

$$2^{-7}(x2),$$

and $$LP'_{minor}/2 = 2^{-2}(x_1 + \overline{x_3} + \overline{x_5} + x_7) + 2^{-3}(x_0) + \quad \text{EQ. (15)}$$

$$2^{-4}(\overline{x_1} + \overline{x_3} + x_5) + 2^{-5}(1 + \overline{x_0}) + 2^{-6}(\overline{x_1} + x_3) +$$

$$2^{-7}(1 + \overline{x_0}) + 2^{-8}(x_1) + 2^{-9}(x_0).$$

To simplify the error compensation circuit, each element in $LP_{minor}$ can be assumed as a random variable with uniform distribution. Then, LP'/2 can be approximated as:

$$LP'/2 \cong LP'_{major}/2 + E[LP'_{minor}/2], \quad \text{EQ. (16)}$$

where E[t] represents the expected value of t.

By using the approximation in EQ. (16), it can be shown that LP'/2 in EQ. (12) can be simplified as:

$$LP'/2 \cong LP'_{major}/2 + 0.7334. \quad \text{EQ. (17)}$$

Using EQ. (10) and EQ. (16), a new error compensation bias according to the present invention is:

$$\sigma_{inv} = \left[ \frac{LP'_{major}}{2} + E\left( \frac{LP'minor}{2} \right) \right]_r. \quad \text{EQ. (18)}$$

Figure 4:
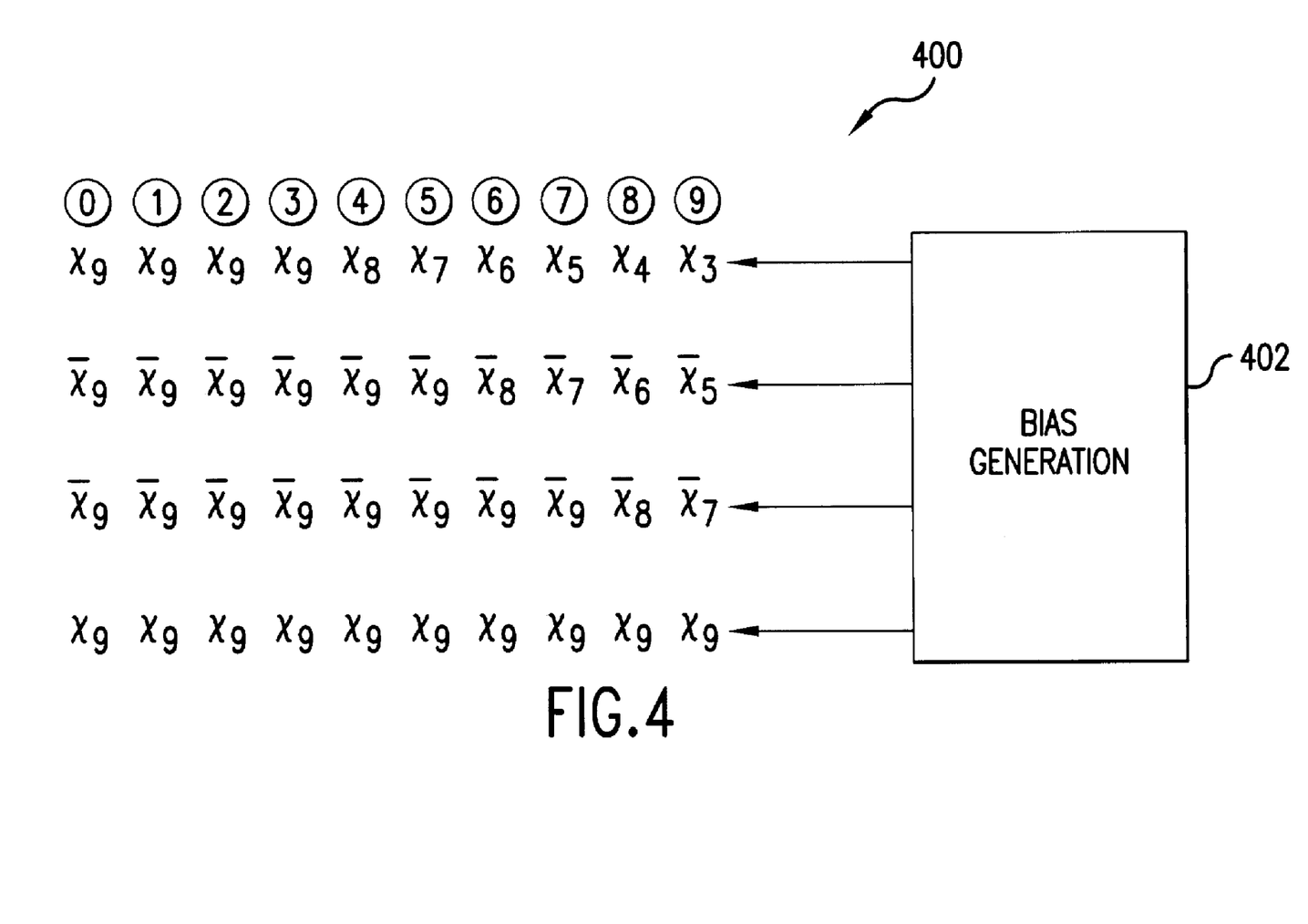
FIG. 4 illustrates the structure of a CSD multiplier according to the invention.

FIG. 4 illustrates an example CSD fixed-width multiplier structure 400 according to the present invention. CSD fixed-width multiplier structure 400 includes a bias generation circuit 402. Bias generation circuit 402 generates the error compensation bias $\sigma_{inv}$ illustrated by EQ. (18). To synthesize bias generation circuit 402, $\sigma_{inv}$ can be computed for each combination of the elements in $LP_{major}$ as shown in FIG. 5.

Figure 5:
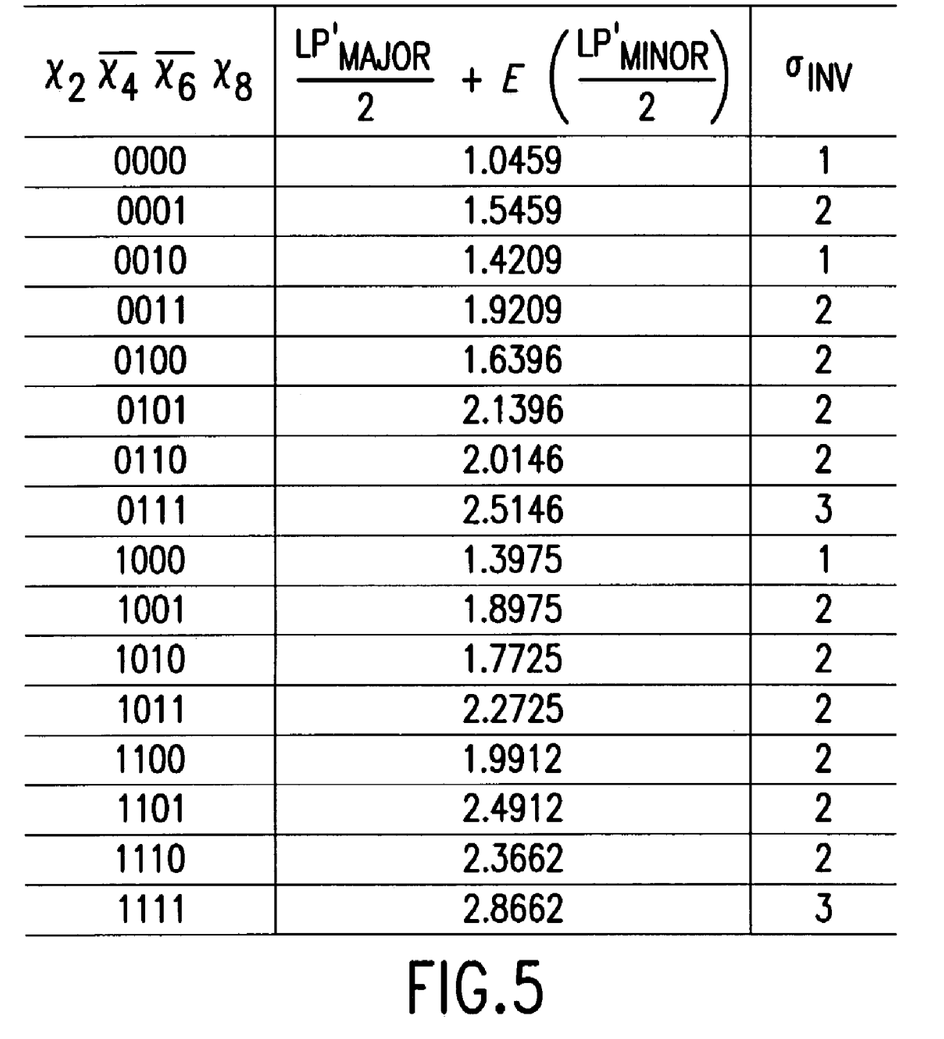
FIG. 5 is a table illustrating error compensation biases ($\sigma_{INV}$) for partial product combinations associated with $LP_{MINOR}$.

Since the maximum value of $\sigma_{inv}$ is 3, as shown in FIG. 5, $\sigma_{inv}$ can be represented as a sum of 3 carry signals as:

$$\sigma_{inv} = C_1 + C_2 + C_3. \quad \text{EQ. (19)}$$

Also, as can be seen from FIG. 5, the minimum value of $\sigma_{inv}$ is 1. Thus, by choosing $C_1 = 1$, EQ. (19) can be rewritten as:

$$\sigma_{prop} = 1 + C_2 + C_3. \quad \text{EQ. (20)}$$

Figure 6:
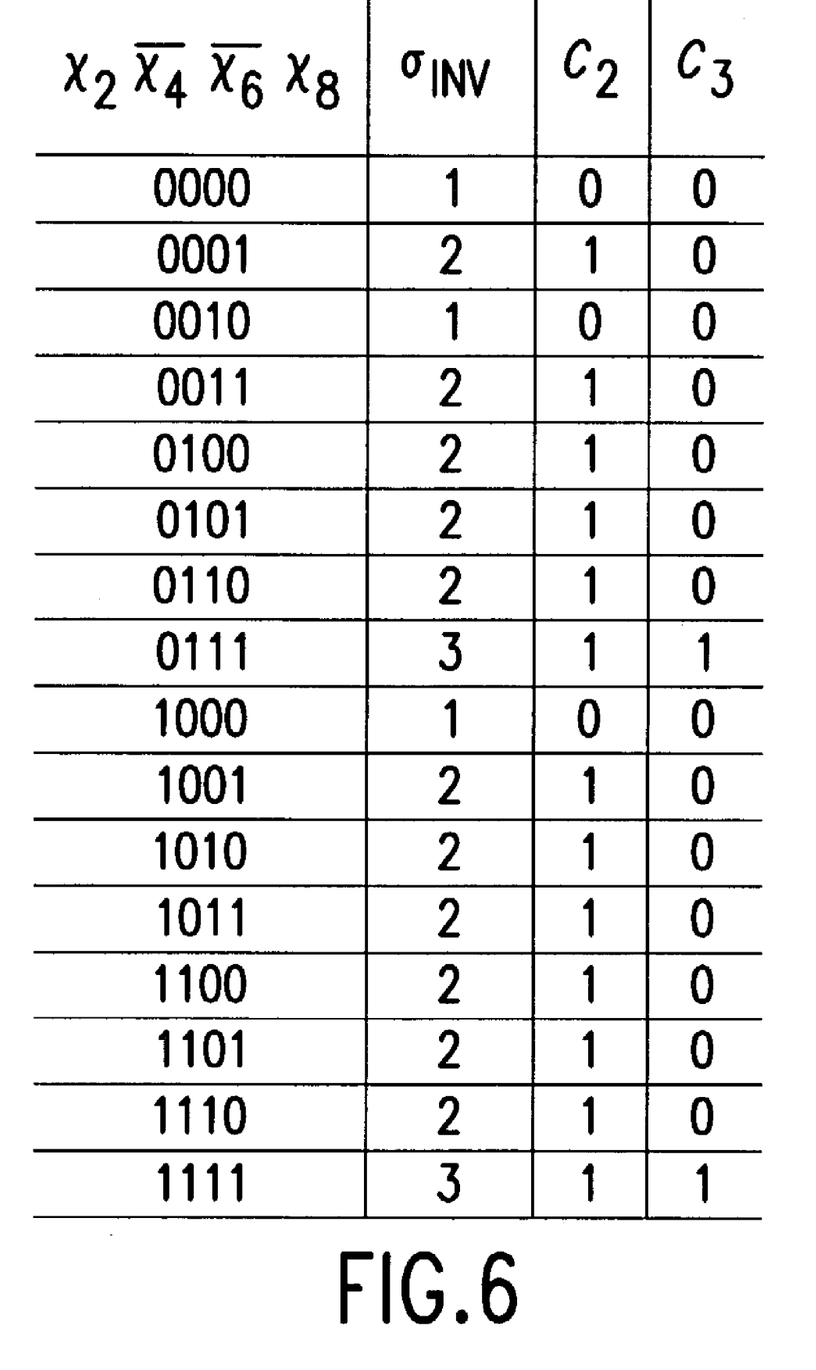
FIG. 6 is a table illustrating carry signals that can be used to generate the error compensation biases ($\sigma_{INV}$) illustrated in FIG. 5.

Then, for each combination of the elements in $LP_{major}$, $C_2$ and $C_3$ can be determined using EQ. (20) as shown in FIG. 6.

By applying a Karnaugh-map technique to the values shown in FIG. 6, $C_2$ can be expressed as a function of the elements in $LP_{major}$ as follows:

$$C_2 = \overline{x_4} \vee x_8 \vee (x_2 \cdot \overline{x_6}), \quad \text{EQ. (21)}$$

where ∨ and • mean the OR and the AND operations, respectively.

By the same way, $C_3$ can be expressed as:

$$C_3 = \overline{x_4} \cdot \overline{x_6} \cdot x_8. \quad \text{EQ. (22)}$$

Figure 7:
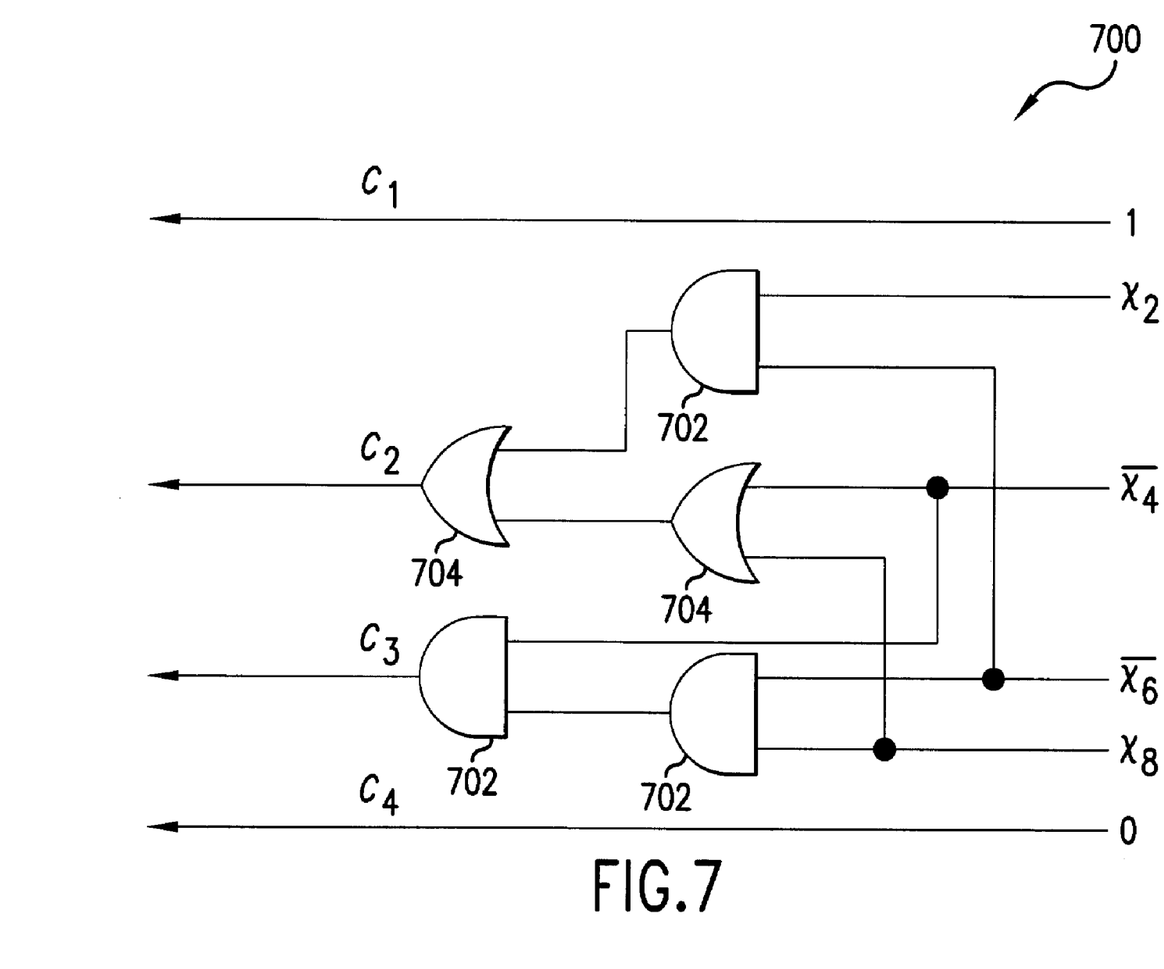
FIG. 7 is a circuit that can be used to generate the carry signals illustrated in FIG. 6.

From EQ. (20), EQ. (21) and EQ. (22), an error compensation bias circuit 700 can be designed as shown in FIG. 7. From FIG. 7, it can be seen that the designed error compensation bias circuit 700 requires only three AND gates 702 and two OR gates 704.

Method for Designing a CSD Fixed-Width Multiplier

Figure 8A:
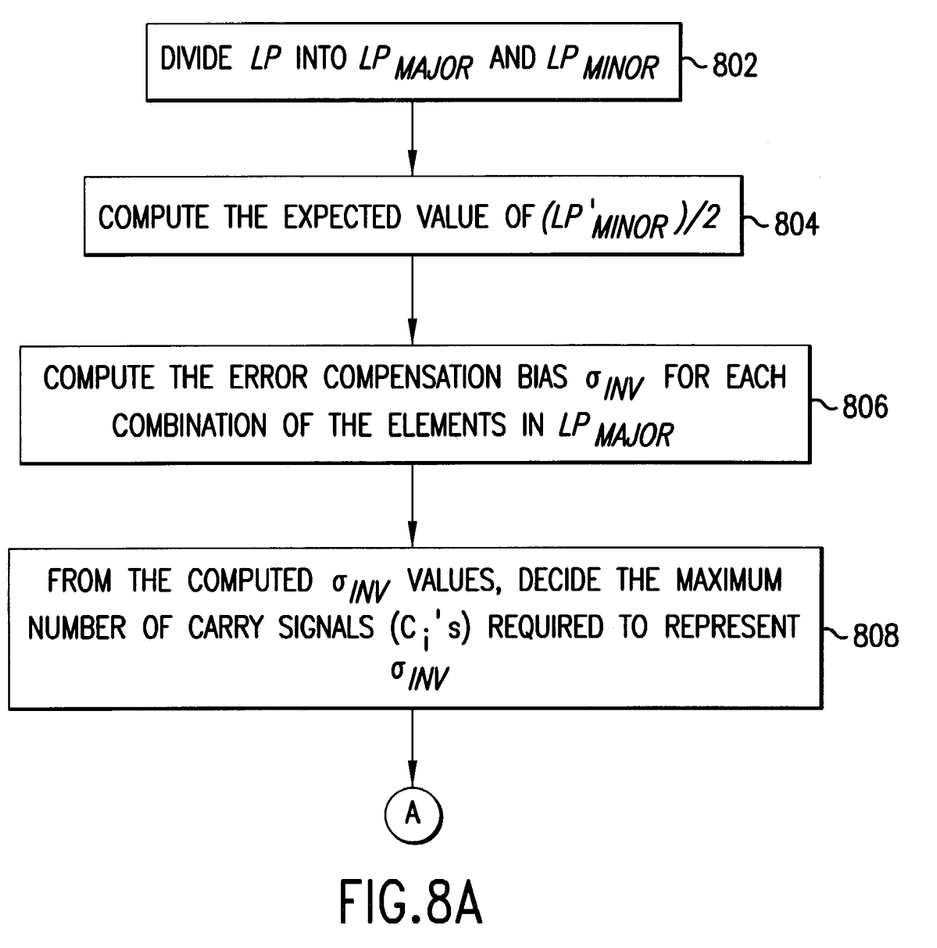
FIGS. 8A–B illustrate a flowchart of the steps of a method for designing a fixed-width multiplier according to the present invention.
Figure 8B:
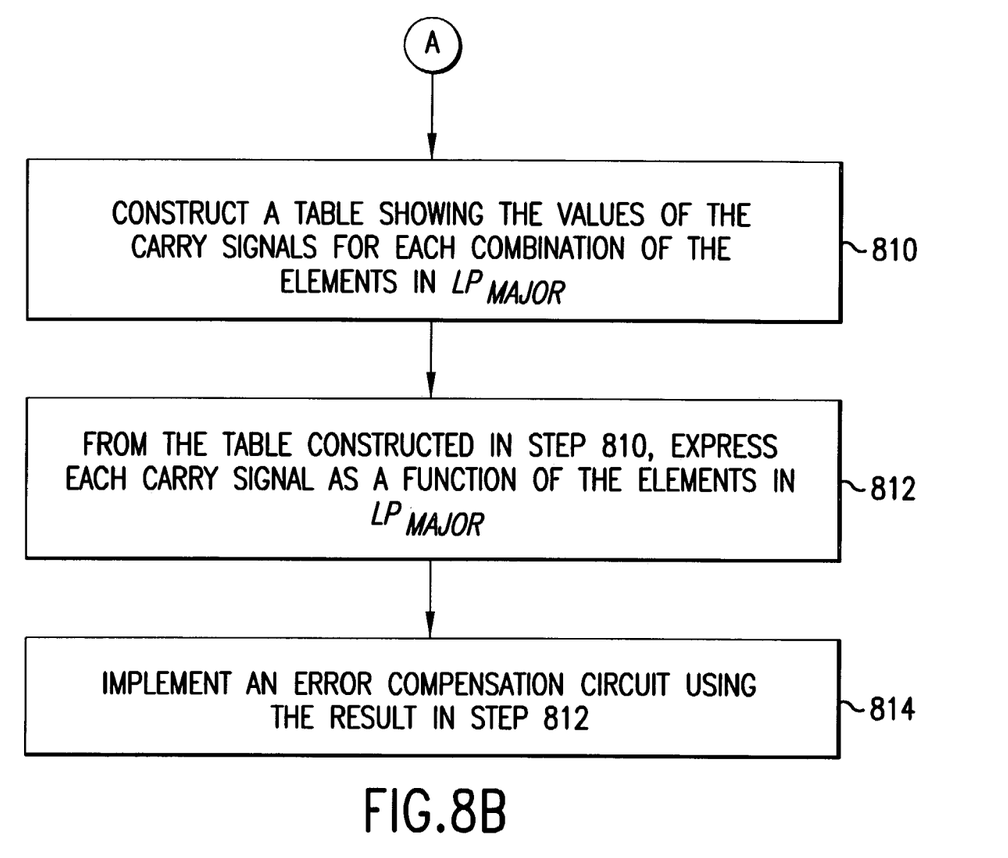

FIGS. 8A and 8B illustrate a flowchart of a method 800 for designing a CSD fixed-width multiplier according to the present invention. As illustrated in FIGS. 8A and 8B, method 800 includes seven steps. These steps summarize the design technique described above.

In step 802, the partial products in LP are divided into two groups, $LP_{major}$ and $LP_{minor}$. The partial products in $LP_{major}$ are those partial products in LP that have a dominant effect on the carry signal and that have the largest weight. The partial products in $LP_{minor}$ are those partial products in LP that do not form a part of $LP_{major}$. FIGS. 2 and 3 illustrate implementation of step 802.

In step 804, the expected value of $LP'_{minor}/2$ is computed.

In step 806, the error compensation bias $\sigma_{inv}$ is computed for each combination of the elements in $LP_{major}$. The implementation of this step is illustrated by FIG. 5.

In step 808, the computed error compensation bias values $\sigma_{inv}$ are used to decide the maximum number of carry signals ($C_i$'s) required to represent $\sigma_{inv}$. As noted above, with regard to FIG. 5, the maximum number of carry signals required is equal to the largest value of $\sigma_{inv}$ computed in step 806.

In step 810, a table showing the values of the carry signals for each combination of the elements in $LP_{major}$ is constructed. Implementation of this step is illustrated by FIG. 6.

In step 812, each carry signal $C_i$ in the table constructed in step 810 is express as a function of the elements in $LP_{major}$. This step can be implemented, for example, by applying a Karnaugh-map technique to the values of the carry signals.

In step 814, an error compensation circuit is implemented using the result in step 812.

Figure 9:
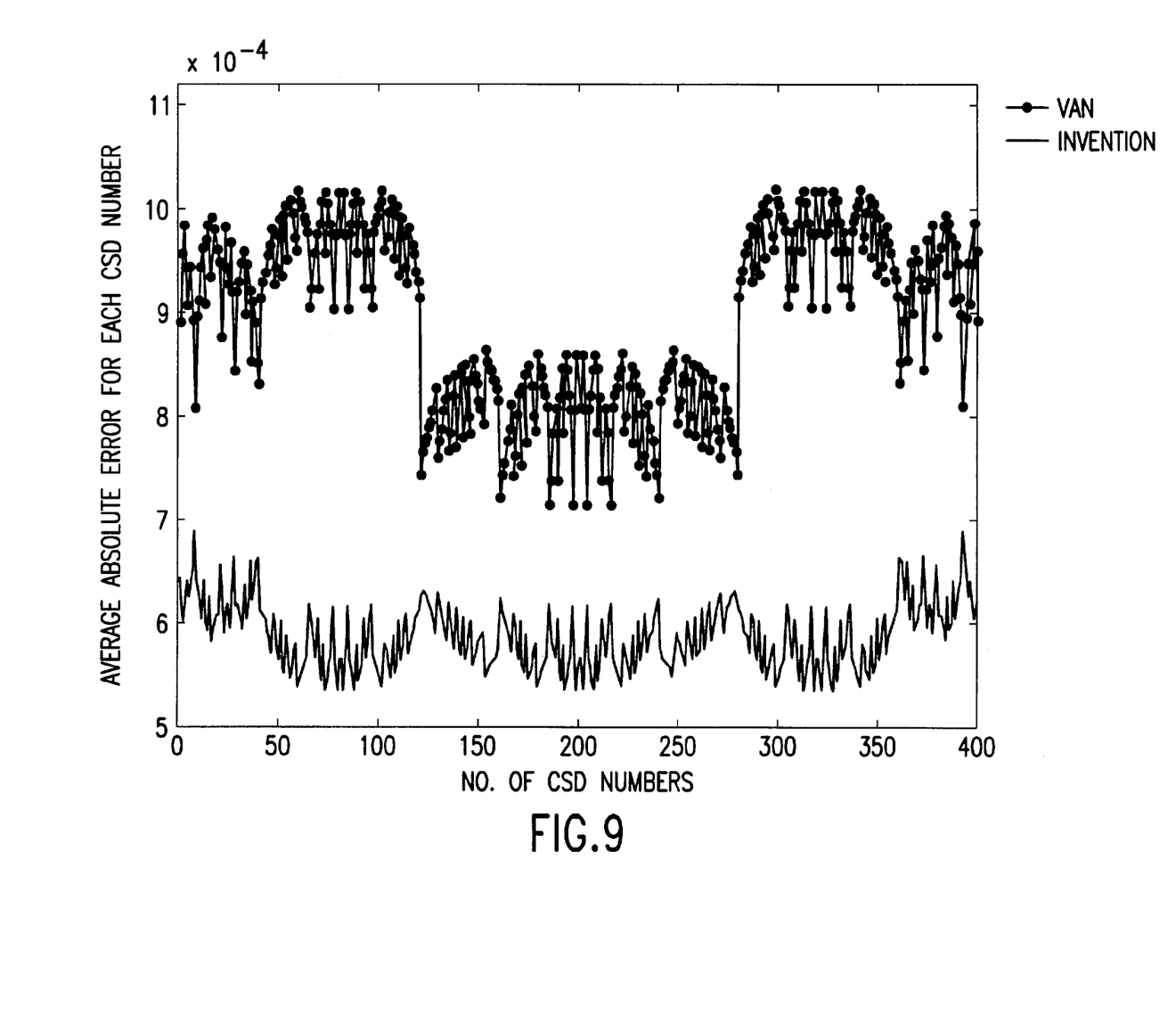
FIG. 9 is a graph comparing the average absolute error for the method of Van et al. and the method of the present invention.

To illustrate the improved accuracy of fixed-width multipliers designed according to method 800, consider the graph shown in FIG. 9. FIG. 9 is a graph comparing the average absolute error for a fixed-width multiplier designed according to the modified method of Van et al. and a fixed-width multiplier designed according to method 800.

As shown in FIG. 9, the average of $\epsilon$ for $\sigma_{inv}$ is thirty-five percent less than that for $\sigma_{van}$. For the comparison illustrated in the graph of FIG. 9, it was assumed that the CSD coefficients had 4 nonzero digits. For each CSD coefficient, the average of the absolute quantization error $\epsilon$ (defined as $\epsilon = |P_r - P_Q|$) was computed for all the 10-bit input words of a 10×10 CSD fixed-width multiplier design. FIG. 9 compares the average of $\epsilon$ obtained by method 800 of the present invention ($\sigma_{inv}$) with that of the method obtained by the modified approach of Van et al.

Figure 10:
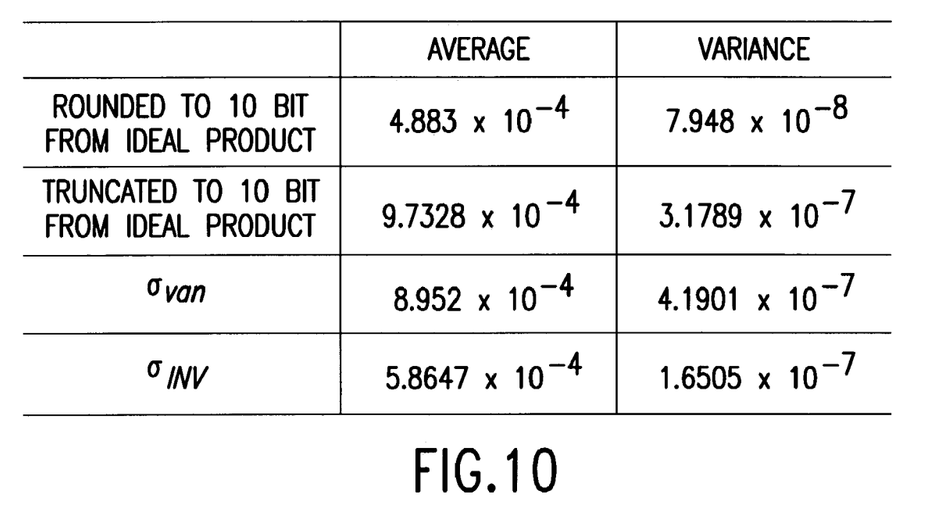
FIG. 10 is a table illustrating the average absolute error and the variance of the absolute error for various quantization schemes.
Figure 11:
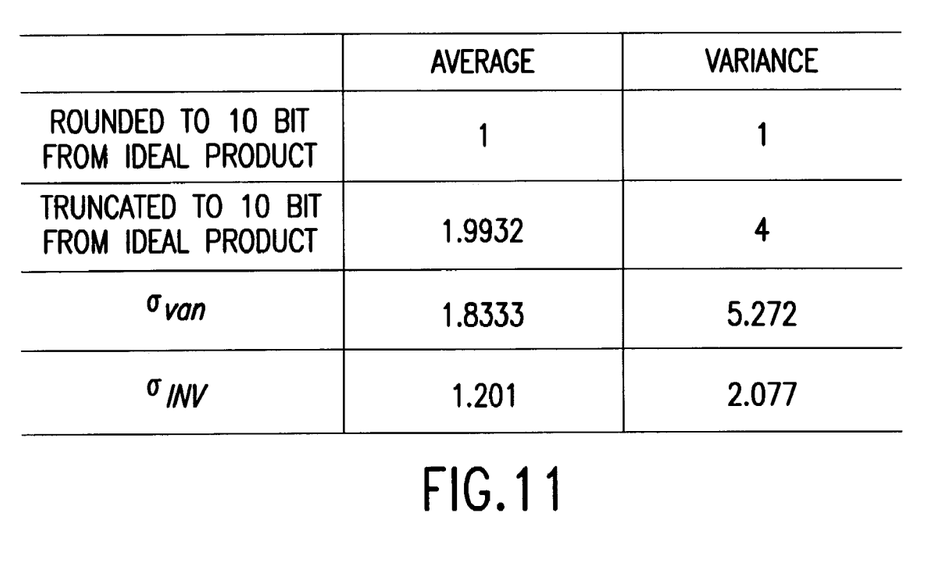
FIG. 11 is a table illustrating the normalized average absolute error and the normalized variance of the absolute error for the quantization schemes in FIG. 10.

FIG. 10 is a table illustrating the average absolute error and the variance of the absolute error for four different quantization schemes. FIG. 11 is a table illustrating the normalized average absolute error and the normalized variance of the absolute error for the quantization schemes in FIG. 10. Notice that the performance of the fixed-width multiplier of method 800 is very close to the rounding operation and much better than the truncation operation.

Furthermore, it can be shown that the error compensation bias circuit for a 10×10 CSD multiplier according to the present invention requires at most 4 AND gates and 4 OR gates. This is a significant advantage over conventional fixed-width multipliers.

CONCLUSIONS

While various embodiments of the present invention have been described above, it should be understood that they have been presented by way of example only, and not limitation. It will be understood by those skilled in the art that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A fixed-width multiplier, comprising:
    a plurality of adder cells; and
    a digital circuit coupled to said plurality of adder cells that generates a compensation bias, said digital circuit being formed by
        selecting a canonic signed digit value (Y),
        multiplying a W-bit variable (X) by the canonic signed digit value (Y) to produce sign-extended partial products each having an associated weight ($2^n$),
        associating each partial product with a most significant bit group (MP) or a least significant bit group (LP),
        associating the partial products of the least significant bit group (LP) with a major least significant bit group ($LP_{major}$) or a minor least significant bit group ($LP_{minor}$),
        computing an error compensation bias for each possible input bit combination of the partial products having the greatest weight of the least significant bit group (LP), and
        forming a circuit to generate the error compensation biases computed in said computing step from the partial products having the greatest weight of the least significant bit group (LP).

2. The fixed-width multiplier of claim 1, wherein said fixed-width multiplier forms part of a digital filter.

3. The fixed-width multiplier of claim 1, wherein said fixed-width multiplier forms part of an equalizer.

4. The fixed-width multiplier of claim 1, wherein said fixed-width multiplier forms part of a receiver.

5. The fixed-width multiplier of claim 1, wherein said fixed-width multiplier forms part of a transceiver.

6. The fixed-width multiplier of claim 1, wherein said fixed-width multiplier forms part of a decoder.

7. The fixed-width multiplier of claim 1, wherein said fixed-width multiplier forms part of a mixer.

8. An integrated circuit having a substrate and a fixed-width multiplier disposed on said substrate, said fixed-width multiplier being designed by:
    selecting a canonic signed digit value (Y);
    multiplying a W-bit variable (X) by the canonic signed digit value (Y) to produce sign-extended partial products each having an associated weight ($2^n$);
    associating each partial product with a most significant bit group (MP) or a least significant bit group (LP);

associating the partial products of the least significant bit group (LP) with a major least significant bit group ($LP_{major}$) or a minor least significant bit group ($LP_{minor}$);

computing an error compensation bias for each possible input bit combination of the partial products having the greatest weight of the least significant bit group (LP);

forming a circuit to generate the error compensation biases computed in said computing step from the partial products having the greatest weight of the least significant bit group (LP); and forming the fixed-width multiplier from the circuit and a plurality of adder cells, the circuit being used to generate carry signals for the plurality of adder cells.

9. The integrated circuit of claim 8, wherein said fixed-width multiplier forms part of a digital filter.

10. The integrated circuit of claim 8, wherein said fixed-width multiplier forms part of an equalizer.

11. The integrated circuit of claim 8, wherein said fixed-width multiplier forms part of a receiver.

12. The integrated circuit of claim 8, wherein said fixed-width multiplier forms part of a transceiver.

13. The integrated circuit of claim 8, wherein said fixed-width multiplier forms part of a decoder.

14. The integrated circuit of claim 8, wherein said fixed-width multiplier forms part of a mixer.

15. A method for forming an error compensation bias circuit for a fixed-width multiplier, the method comprising:

selecting a canonic signed digit value (Y);

multiplying a W-bit variable (X) by the canonic signed digit value (Y) to produce sign-extended partial products each having an associated weight ($2^n$);

associating each partial product with a most significant bit group (MP) or a least significant bit group (LP);

associating the partial products of the least significant bit group (LP) with a major least significant bit group ($LP_{major}$) or a minor least significant bit group ($LP_{minor}$);

computing an error compensation bias for each possible input bit combination of the partial products having the greatest weight of the least significant bit group (LP); and forming a circuit to generate the error compensation biases computed in said computing step from the partial products having the greatest weight of the least significant bit group (LP).

16. An error compensation bias circuit for a fixed-width multiplier having a plurality of adder cells, comprising:

a circuit, coupled to the plurality of adder cells, that generates a compensation bias, said circuit being formed by selecting a canonic signed digit value (Y), multiplying a W-bit variable (X) by the canonic signed digit value (Y) to produce sign-extended partial products each having an associated weight ($2^n$), associating each partial product with a most significant bit group (MP) or a least significant bit group (LP), associating the partial products of the least significant bit group (LP) with a major least significant bit group ($LP_{major}$) or a minor least significant bit group ($LP_{minor}$), computing an error compensation bias for each possible input bit combination of the partial products having the greatest weight of the least significant bit group (LP), and forming a digital circuit to generate the error compensation biases computed in said computing step from the partial products having the greatest weight of the least significant bit group (LP).

17. The error compensation bias circuit of claim 16, wherein said error compensation bias circuit forms part of a digital filter.

18. The error compensation bias circuit of claim 16, wherein said error compensation bias circuit forms part of an equalizer.

19. The error compensation bias circuit of claim 16, wherein said error compensation bias circuit forms part of a receiver.

20. The error compensation bias circuit of claim 16, wherein said error compensation bias circuit forms part of a transceiver.

21. The error compensation bias circuit of claim 16, wherein said error compensation bias circuit forms part of a decoder.

22. The error compensation bias circuit of claim 16, wherein said error compensation bias circuit forms part of a mixer.

* * * * *